(12) United States Patent
Olson

(10) Patent No.: US 10,564,022 B2
(45) Date of Patent: Feb. 18, 2020

(54) AIRCRAFT FUEL GAUGING METHOD USING VIRTUAL PROBES

(71) Applicant: Simmonds Precision Products, Inc., Vergennes, VT (US)

(72) Inventor: Barry R. Olson, Lincoln, VT (US)

(73) Assignee: Simmonds Precision Products, Inc., Vergennes, VT (US)

(*) Notice: Subject to any disclaimer, the term of this patent is extended or adjusted under 35 U.S.C. 154(b) by 298 days.

(21) Appl. No.: 15/490,568

(22) Filed: Apr. 18, 2017

(65) Prior Publication Data

US 2018/0299312 A1 Oct. 18, 2018

(51) Int. Cl.
| | |
|---|---|
| G01F 22/00 | (2006.01) |
| G01C 9/00 | (2006.01) |
| G01F 23/26 | (2006.01) |
| G01F 23/00 | (2006.01) |
| B64D 37/00 | (2006.01) |

(52) U.S. Cl.
CPC ............ *G01F 22/00* (2013.01); *B64D 37/00* (2013.01); *G01C 9/005* (2013.01); *G01F 23/0069* (2013.01); *G01F 23/0076* (2013.01); *G01F 23/263* (2013.01)

(58) Field of Classification Search
CPC ............ G01C 9/005; G01F 22/00; B64C 3/34
See application file for complete search history.

(56) References Cited

U.S. PATENT DOCUMENTS

| | | | | |
|---|---|---|---|---|
| 5,124,933 A | * | 6/1992 | Maier | ................. G01F 23/0076 340/612 |
| 5,670,710 A | | 9/1997 | Atkinson | |
| 6,502,042 B1 | | 12/2002 | Eid et al. | |
| 6,577,960 B1 | * | 6/2003 | Rabelo | ................. G01F 23/0069 702/55 |
| 7,225,671 B2 | | 6/2007 | Atkinson | |
| 7,843,355 B2 | | 11/2010 | Davis | |
| 9,567,093 B2 | | 2/2017 | Haskins et al. | |
| 2012/0150517 A1 | | 6/2012 | Ray et al. | |
| 2017/0060268 A1 | * | 3/2017 | Chiu | ..................... G06F 3/0346 |
| 2018/0188098 A1 | * | 7/2018 | Souques | ............... B64D 37/00 |

FOREIGN PATENT DOCUMENTS

| | | |
|---|---|---|
| WO | WO0045136 A2 | 8/2000 |
| WO | WO2017051210 A1 | 3/2017 |

OTHER PUBLICATIONS

Extended European Search Report for EP Application No. 18167663.6, dated Aug. 28, 2018, 5 Pages.

* cited by examiner

*Primary Examiner* — Eric S. McCall
*Assistant Examiner* — Timothy P Graves
(74) *Attorney, Agent, or Firm* — Kinney & Lange, P.A.

(57) ABSTRACT

A method of fuel gauging includes the use of limited physical probes and a number of virtual probes that are mathematically represented despite having no physical representation. Each probe determines the volume of fuel in a particular section of the fuel tank. The calculation method includes using the attitude of the fuel tank to calculate the rotation of each physical probe, using this information to determine the height of the fuel at each physical probe, and extrapolating the physical height information to determine the position of each virtual probe. Once the information on each physical and virtual probe is obtained, a total fuel volume can be calculated.

20 Claims, 3 Drawing Sheets

AIRCRAFT FUEL GAUGING METHOD USING VIRTUAL PROBES

BACKGROUND

This invention relates generally to fluid gauging systems, and particularly to fuel gauging systems and methods in aircraft.

Fuel gauging systems in aircraft are employed to measure the quantity of fuel left in aircraft fuel tanks. Typically, aircraft fuel tanks are of differing sizes, shapes, and geometries, depending on the location of the fuel tank. For instance, fuel tanks on the wings of aircraft are complicated in shape. This complicates the calculations that must be completed to determine the amount of fuel remaining in a fuel tank. This is further complicated by the position of the aircraft: when the aircraft is in flight, the fuel is at a different position than when the aircraft is on the ground. The attitude of the aircraft and its fuel tank changes the location and height of fuel.

In the art, fuel gauging systems utilize a variety of physical probes (typically capacitive probes) to determine fuel volume in a fuel tank on an aircraft. Typically, each physical probe is designated to a certain volume area of the fuel tank. The physical probe is usually a sensor designed to determine the height of fuel with which it comes into contact. Based on where fuel "cuts" across the physical probe, the volume of that probe's area of the fuel tank can be determined.

However, physical probes are complicated sensors that are expensive to manufacture and maintain. Moreover, physical probes take up volume and mass in an aircraft fuel tank where volume and mass are limited.

SUMMARY

A method of fuel gauging for an aircraft, the method including determining an attitude and an acceleration of a fuel tank, obtaining measured capacitances from physical probes within the fuel tank, determining a height of fuel in the fuel tank relative to each of the physical probes using the measured capacitances of the physical probes and the attitude of the fuel tank, estimating a height of fuel relative to each of a plurality of virtual probes based on the heights of fuel relative to the physical probes and the attitude of the fuel tank and determining a total volume of fuel in the fuel tank using the heights of fuel relative to the physical probes, the heights of the fuel relative to the virtual probes, and the attitude of the fuel tank.

A fuel gauging system for an aircraft includes a fuel tank containing a plurality of physical probes, a data concentrator configured to receive signals from the plurality of physical probes, an avionics system configured to calculate attitude of the aircraft, and a fuel quality processing unit designed to receive data from the data concentrator and the avionics system, the fuel quality processing unit configured to calculate a total volume of fuel in the fuel tank based on received signals from the plurality of physical probes, simulated signals from a plurality of virtual probes, and the attitude of the aircraft.

DETAILED DESCRIPTION

Fuel gauging systems typically estimate the volume of fuel available within a fuel tank based on readings from physical probes within the fuel tank. This information is critical when aircraft are in flight. However, as aircraft fly, fuel tanks onboard tilt and shift, making determining volume of fuel difficult. Typically, a large number of complicated physical probes are used to determine fuel height in conjunction with aircraft orientation. Sensed fuel heights are then used to calculate estimated fuel volume. However, physical probes take up significant mass and volume within a fuel tank. Thus, virtual probes, that are mathematical representations of probes, can be used to replace some physical probes in fuel gauging calculations.

Figure 1:
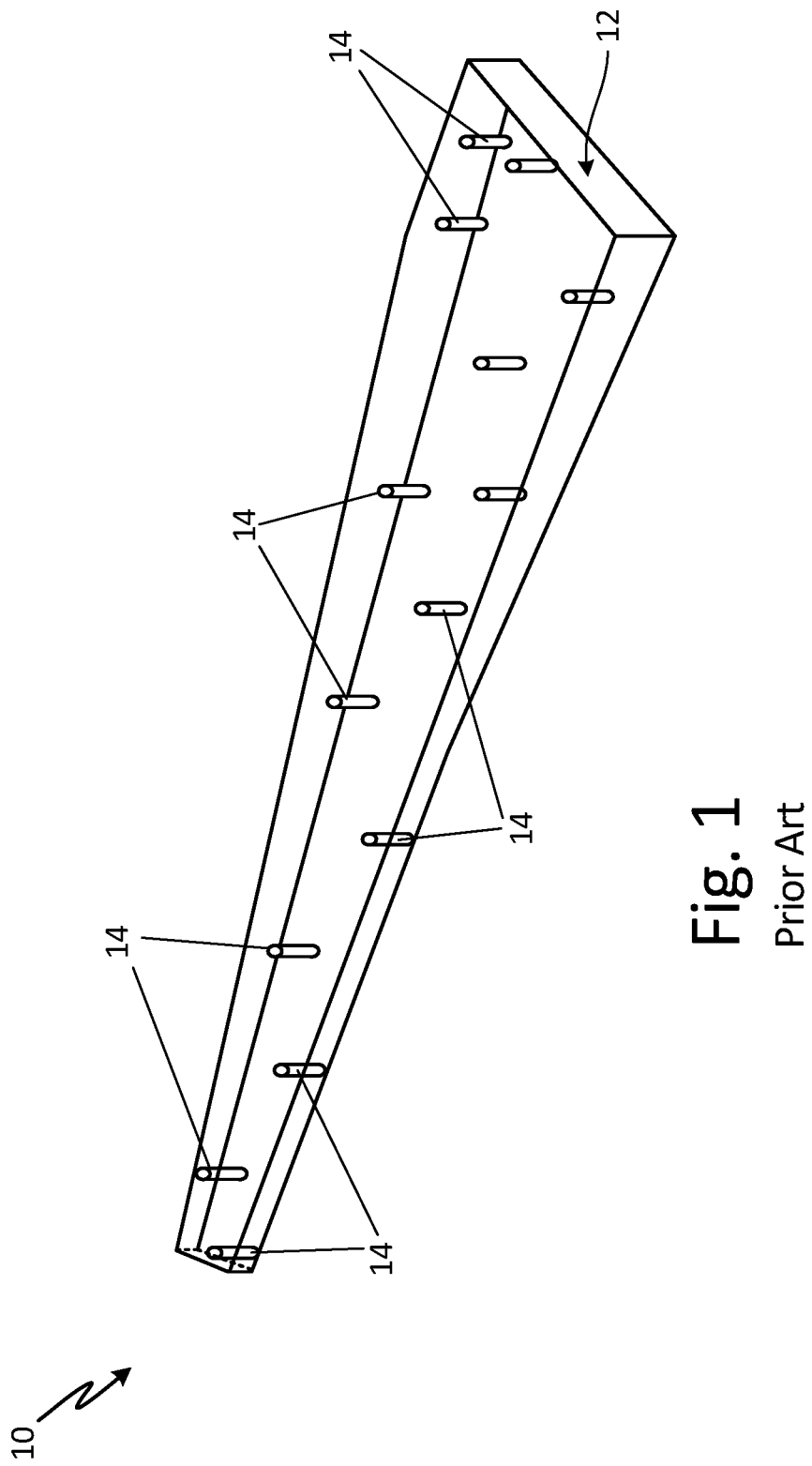
FIG. 1 is a schematic drawing of a traditional fuel tank set-up used for fuel gauging calculations as found in prior art.

FIG. 1 is a schematic drawing of a traditional fuel tank set-up used for fuel gauging calculations as found in prior art. Fuel tank set-up 10 includes wing tank 12 and physical probes 14.

Figure 2:
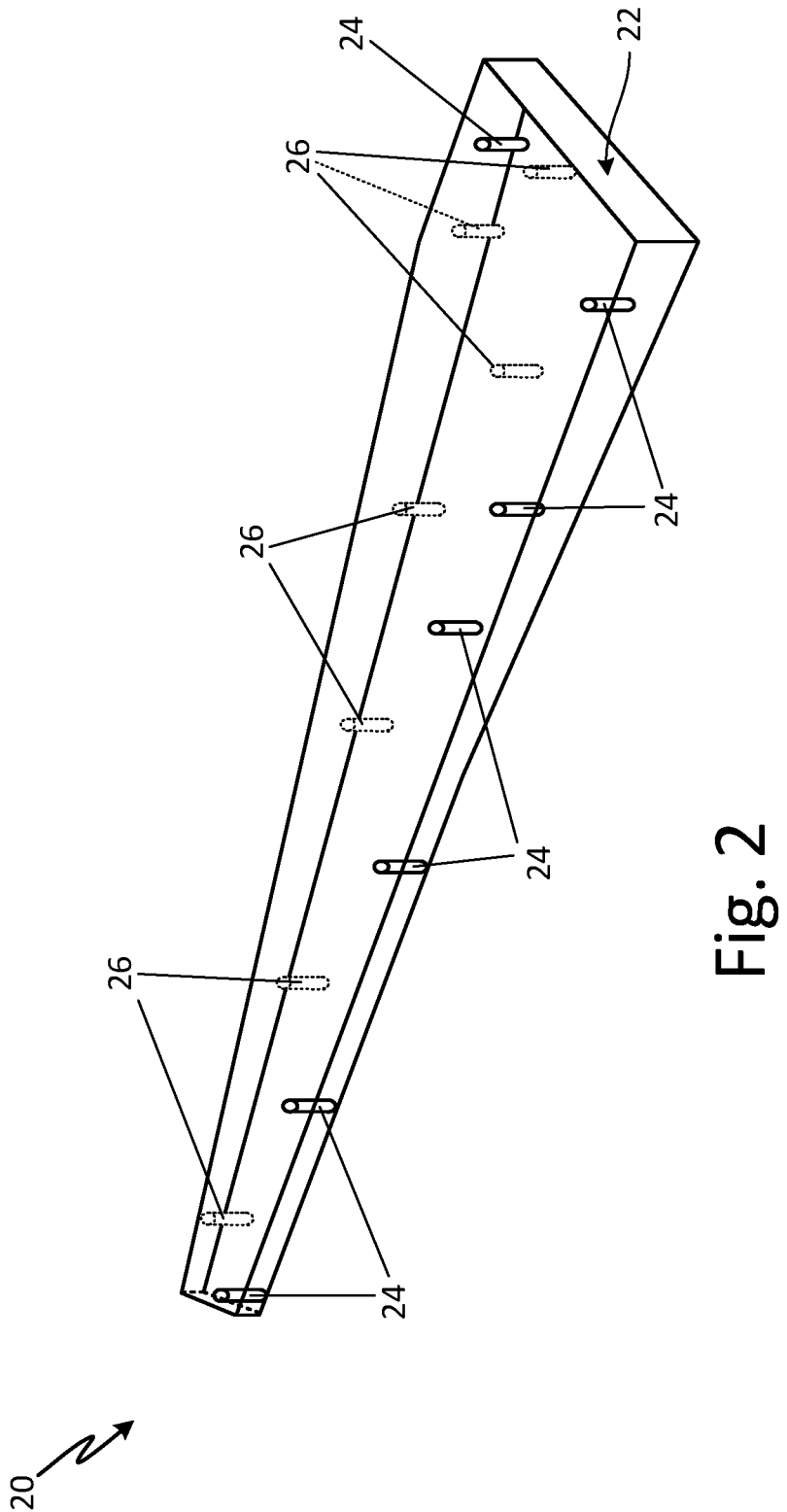
FIG. 2 is a schematic drawing of a fuel tank set-up used for fuel gauging calculation that includes virtual probes.

On an aircraft, fuel tanks are commonly wing tanks or fuselage tanks. Wing tanks are shaped to fit in the wings of an aircraft. Fuselage tanks are additional fuel tanks fitted closely to a profile of an aircraft in or near the aircraft's main body. Both types of fuel tanks are irregular in shape and contain complex geometries, making the task of determining remaining fuel in the tanks difficult. This is further complicated when the aircraft is in flight and the tanks are not level. In FIGS. 1 and 2, wing tank 12 is used as an example.

Physical probes 14 are fluid level sensors situated within wing tank 12, and capable of reporting a level or height of fluid at a position within wing tank 12. In the illustrated embodiment, physical probes 14 are capacitive probes distributed throughout wing tank 12. Capacitive probes measure the dielectric permittivity of a surrounding medium, and can, for example, report a position on each sensor at which the fluid surface of fuel within wing tank 12 intersects the probe. Aircraft fuel tank monitoring systems use fuel capacitance probes to produce a reading on fuel capacity. In this case, capacitive probes 14 sense fuel in wing tank 12. Physical probes 14 collect capacitance, resistance, and status data correlating to the level of fuel in wing tank 12.

Typically, 9 to 12 physical probes are present in an average wing tank. Each probe is responsible for providing data on a surrounding volume of wing tank 12. Thus, the complex geometry of wing tank 12 can be broken down into smaller volumes as detected by each physical probe 14. The combined data collected by probes 14 is sent to a signal convertor and then a processor (not pictured), where it is converted to usable readings.

Due to the asymmetric shape of fuel tanks, an actual volume of fuel assigned to each physical probe 14 varies based on attitude of the fuel tank. Attitude is the orientation of an aircraft relative to Earth's horizon. An aircraft's attitude includes pitch (or fore and aft tilt of the aircraft) and roll (side to side tilt of the aircraft). Attitude is generally detected by an attitude indicator such as an accelerometer or an array of accelerometers. When an aircraft is on the ground, its attitude is level.

Data collected from physical probes 14 in wing tank 12, in conjunction with attitude information, is used to calculate total volume of fuel in wing tank 12. Total volume of fuel in wing tank 12 is a summation of fuel volumes based on readings from physical probes 14:

Total Fuel Volume=Σ Probe Fuel Volumes

Probe fuel volumes can be obtained from using calculated probe fuel heights in a lookup table. The calculations are discussed in more detail below.

Fuel height at each probe 14 (the percent of probe 14 immersed in fuel) can be used to extrapolate total volume of fuel in that probe's portion of fuel tank 12 when applied to a mathematical model of the fuel tank. In one embodiment, these extrapolations are accomplished through use of a pre-generated fuel tank study based on the locations and heights of the probes. The study generates a lookup table where each increment of height on a physical probe 14 correlates to a volume of fuel.

The calculation of total volume of fuel is a multi-step process. First, the attitude and acceleration information is obtained to determine the effective pitch (P) and effective roll (R). This information can be obtained from the aircraft or a default approximation can be used. Prior to this calculation, a table showing each physical probe's coordinates ($p_x$, $p_y$, $p_z$) relative to the aircraft is compiled.

Each physical probe 14's measured capacitance ($C_M$) (capacitance as detected by probe 14, minus any stray capacitance added by surrounding wiring) is used to calculate the fractional fuel coverage (α) of that physical probe 14 as follows:

$$\alpha = (C_M - C_D)/e(C_A)$$

In this calculation, $C_M$ is the capacitance measured at probe 14. Meanwhile, $C_D$ is the dry capacitance (the capacitance that would be measured by probe 14 if probe 14 is entirely exposed to air) of probe 14. $C_A$ represents the active capacitance of probe 14 (the capacitance that would be measured by probe 14 if probe 14 was completed immersed in fuel), while e represents a dielectric multiplier. The resulting fractional fuel coverage a represents the percent of physical probe 14 covered by fuel.

Together, the effective pitch (P), effective roll (R), physical probe 14 top coordinates ($pt_x$, $pt_y$, $pt_z$), and physical probe bottom coordinates ($pb_x$, $pb_y$, $pb_z$) are used to determine the effective top of the probe ($pt_e$) and effective bottom of the probe ($pb_e$) in the following calculations:

$$pt_e = (pt_z * \cos(P) * \cos(R)) - (pt_y * \cos(P) + \sin(R)) - (pt_x * \sin(P))$$

$$pb_e = (pb_z * \cos(P) * \cos(R)) - (pb_y * \cos(P) + \sin(R)) - (pb_x * \sin(P))$$

Effective probe top ($pt_e$), effective probe bottom ($pb_e$) can then be used in conjunction with the earlier calculated fractional fuel coverage (α) to determine effective probe fuel height ($f_e$):

$$f_e = (\alpha * (pt_e - pb_e)) + pb_e$$

The effective probe fuel height ($f_e$) will be approximately the same for all partially immersed physical probes 14.

Overall, the actual calculation of volume of fuel based on physical probes 14 is determined based on the percent of the probe covered by fuel and the length of the probe. The percent of the probe covered by fuel is equal to the measured height of fuel against the probe minus the "empty capacitance" of the probe, then divided by the "full capacitance" of the probe times a dielectric. The percent of the probe covered by fuel and the length of the probe are then multiplied to produce a probe fuel height. The probe fuel height is inputted to the tank study, and the lookup table generates a volume of fuel in the tank. Typically, the volume is interpolated from the two closest measurements on the lookup table. The resulting fuel volumes for each probe (obtained from the look-up table) are summed to obtain total fuel volume in fuel tank 12.

Error can occur when determining the volume of fuel in a fuel tank due to the aircraft's attitude. Higher numbers of probes produce a lower variance in fuel volume calculations due to aircraft changes in attitude, and consequently enable more reliable estimates of current fuel volume. However, additional probes in a fuel tank increase cost and weight of the overall fuel tank and probes, in addition to reducing fuel capacity of the tank.

FIG. 2 is a schematic drawing of fuel tank set-up 20 used for fuel gauging calculation that includes virtual probes. Wing tank 22 includes physical probes 24 and virtual probes 26. Wing tank 22 is similar to wing tank 12 of FIG. 1, but reduces the number of physical probes 24 needed to calculate total volume of fuel in wing tank 22. Instead, calculation of total volume of fuel in wing tank 22 is done with virtual probes 26 that represent locations where real probes could be placed within wing tank 22.

The number of physical probes 24 is reduced from 9-12 probes on average to 6-8 probes on average. This decreases the weight and volume of probes inside fuel tank 22. Physical probes 24 still provide readings on capacitance, resistance, and status data correlating to the level of fuel in wing tank 22. The data provided by physical probes 24, in conjunction with information about the attitude of the aircraft, is used to approximate what fuel height readings would be at virtual probes 26.

FIG. 2 illustrates several "virtual probes" 26 in wing tank 22. Virtual probes 26 are not physical probes inside wing 22. Rather, they are locations within wing tank 22 where calculations are made as if a physical probe were placed in that location. Like physical probes 24, each virtual probe is responsible for one portion or section of wing tank 22. In some embodiments, between 12 and 14 virtual probes 24 can be used in fuel volume calculations for fuel tank set-up 20. More generally, any number and location of virtual probes 24 can be selected based on the geometry of wing tank 22 and the expected inputs of fuel level processing systems.

Virtual probe calculations are used with readings from physical probes and the attitude of the fuel tank to calculate the total volume of fuel in the fuel tank and employ the calculation method discussed with reference to FIG. 1, but with additional steps. Similarly, the final calculation of total fuel volume is a summation of fuel volumes based on readings from physical probes 24 and virtual probes 26:

Total Fuel Volume=Σ Probe Fuel Volumes

First, the attitude of the fuel tank is determined by calculation or default. The attitude can be determined by instruments on the aircraft itself, such as accelerometers (as described in further detail below with respect to FIG. 3), can be set to a default based on flight status (usually level when on ground and nose up (positive pitch) if airborne), or can be calculated from flight data.

Next, a mathematical model of the probes within the fuel tank (based on the relative three dimensional position of each end of each probe with respect to a point on the aircraft) is rotated to align with the current attitude of the actual fuel tank. The mathematical model of the fuel tank is created to represent the geometries of the fuel tank, including varying heights, shapes and spaces within the tank. The rotated mathematical model of the fuel tank is used to determine the rotation and pitch of physical probes within the fuel tank.

Once rotated, fuel will intersect all the probes at the same height with respect to the reference point. Each probe's location, pitch and rotation are necessary to determine the amount of fuel in each portion of the tank corresponding to a physical probe. This calculation is described in detail with reference to FIG. 1.

The information detected by the physical probes is used to calculate height of fuel in the fuel tank relative to the physical probes in the rotated mathematical model of the fuel tank. This can be represented as a plane in three dimensions, and is created by utilizing the sum of physical probes' readings and specific scaling factors for each probe. The scaling factors are determined by the individual physical probes' locations.

Effective probe fuel height ($f_e$), as determined by equations explained with reference to FIG. 1, should be approximately the same for all partially immersed physical probes 24. Thus, effective probe fuel heights are averaged within a given tank segment to give an effective tank segment fuel height ($t_e$).

The height of fuel relative to a reference point, in the form of an extrapolated plane, is used as the fractional coverage height of fuel for each of the virtual probes ($\alpha_v$), in conjunction with effective probe bottom and top measurements ($pt_e$, $pb_e$):

$$\alpha_v = (t_e - pb_e)/(pt_e - pb_e)$$

Finally, volume of fuel in the fuel tank is calculated. This can be done by using a lookup table (specific to the tank and current flight) with height and volume information for each probe (physical or virtual) to determine individual volume for each probe's section of the tank. Finally, the total volume of fuel in the tank is calculated by summing the individual probes' relative volumes of fuel.

Additionally, this method can be applied to "replace" broken physical probes with virtual probes. If a physical probe breaks, the calculation of total fuel volume can be adjusted to mathematically place a virtual probe in the location of the broken physical probe. As long as one or more physical probe remains in the tank and has a measurable height of fuel, the calculation of total fuel volume can still be done.

Figure 3:
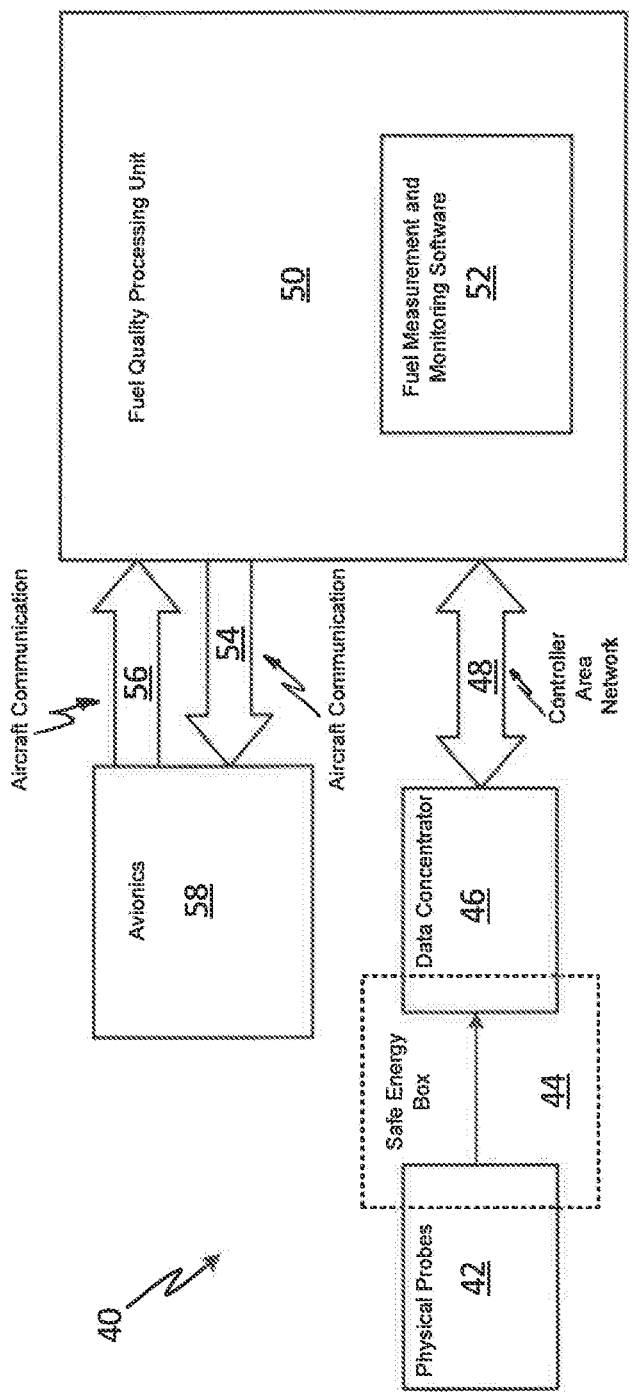
FIG. 3 is a schematic diagram representing a fuel gauging system in an aircraft.

FIG. 3 is a schematic diagram depicting a fuel gauging system in an aircraft. Fuel gauging system 40 includes physical probes 42, safe energy box 44, data concentrator 46, controller area network 48, fuel quality processing unit 50, fuel measurement and monitoring software 52, aircraft communications 54, 56, and avionics 58 (that include an attitude sensor such as an accelerometer).

As discussed above with respect to FIG. 2, physical probes 42 can be capacitive probes situated throughout a tank Safe energy box 44 consists of connectors and wires (not shown) that connect physical probes 42 to data concentrator 46 and transmit data collected by physical probes 42. Safe energy box 44 is a protected interface between a wet side and a dry side of wiring that must be protected from voltage surges (surges would cause an explosion within the aircraft). Safe energy box 44 protects wires from a volatile environment inside a fuel tank and protects the wires and fuel tank from voltage surges that could cause quick burning of fuel inside the fuel tank.

Data concentrator 46 is located near a tank to reduce the amount of wiring in safe energy box 44. Data concentrator 46 receives signals from the wires in safe energy box 44 and transfers signals to controller area network (CAN) 48 that is in turn connected to fuel quality processing unit (FQPU) 50.

FQPU 50, which includes fuel measurement and monitoring software 52, interfaces with both data concentrator 46 and avionics 58 and generates a calculation of fuel quantity as described in reference to FIG. 2. Data concentrator 46 provides readings from physical probes 42, while avionics 58 provide aircraft attitude, including pitch and bank information necessary to determine attitude. Typically, avionics 58 includes attitude sensors. Aircraft communications 54, 56 can be an Aeronautical Radio INC 429 (ARINC 429), an industry standard set of communication for aircraft. ARINC 429 executes messages between FQPU 50 and 58.

The proposed system and method of fuel gauging increases the overall accuracy of total fuel volume calculations by adding virtual probes. The addition of virtual probes also allows a decrease in the number of necessary physical probes, reducing weight, volume, and cost of creating a fuel gauging system within a fuel tank in an aircraft.

Discussion of Possible Embodiments

The following are non-exclusive descriptions of possible embodiments of the present invention.

A method of fuel gauging for an aircraft, the method including determining an attitude and an acceleration of a fuel tank, obtaining measured capacitances from physical probes within the fuel tank, determining a height of fuel in the fuel tank relative to each of the physical probes using the measured capacitances of the physical probes and the attitude of the fuel tank, estimating a height of fuel relative to each of a plurality of virtual probes based on the heights of fuel relative to the physical probes and the attitude of the fuel tank and determining a total volume of fuel in the fuel tank using the heights of fuel relative to the physical probes, the heights of the fuel relative to the virtual probes, and the attitude of the fuel tank.

The method of the preceding paragraph can optionally include, additionally and/or alternatively, any one or more of the following features, configurations and/or additional components:

The physical probes are spaced throughout the fuel tank such that at least one physical probe is always intersected by a surface of the fuel.

Determining the attitude and acceleration of the fuel tank comprises referencing a default attitude and acceleration for the aircraft.

The method includes determining the rotation and the pitch of the physical probes within the fuel tank from the attitude of the fuel tank, and the assigned coordinates of each probe are used in combination with the measured capacitances of each probe and the attitude of the fuel tank to determine the height of fuel in the fuel tank relative to each of the physical probes, and to estimate the height of fuel relative to each of the plurality of virtual probes.

The physical probes are each assigned coordinates within the fuel tank.

Determining a height of fuel in the fuel tank relative to each of the physical probes includes calculating a fractional fuel coverage relative to each of the physical probes, calculating an effective top for each of the physical probes, calculating an effective bottom for each of the physical probes, and calculating a height of fuel in the fuel tank relative to each of the physical probes using the fractional fuel coverage, the effective top, and the effective bottom.

Calculating the fractional fuel coverage comprises using the measured capacitance, a dry capacitance, and an active capacitance to calculate the fractional fuel coverage.

Calculating heights of fuel relative to virtual probes comprises extrapolating the heights of fuel relative to the physical probes to the virtual probe locations.

Each physical probe is assigned to a zone of the fuel tank, and each virtual probe is assigned a zone of the fuel tank.

Determining a total volume of fuel in the fuel tank comprises inserting the height of fuel relative to each physical probe in to a look-up table to obtain a zone fuel volume corresponding to each physical probe, inserting the height of fuel relative to each virtual probe in to a look-up table to obtain a zone fuel volume corresponding to each virtual probe, and adding together the zone fuel volumes corresponding to each physical probe and the zone fuel volumes corresponding to each virtual probe.

The method includes determining a fuel mass of the fuel tank by multiplying the total volume of fuel in the fuel tank by a density of fuel in the fuel tank.

A fuel gauging system for an aircraft includes a fuel tank containing a plurality of physical probes, a data concentrator configured to receive signals from the plurality of physical probes, an avionics system configured to calculate attitude of the aircraft, and a fuel quality processing unit designed to receive data from the data concentrator and the avionics system, the fuel quality processing unit configured to calculate a total volume of fuel in the fuel tank using a model of the fuel tank comprising one or more virtual probes, signals from the plurality of physical probes, and the attitude of the aircraft.

The system of the preceding paragraph can optionally include, additionally and/or alternatively, any one or more of the following features, configurations and/or additional components:

The system includes an aeronautical radio configured to communicate between the fuel quality processing unit and the avionics system.

The avionics system is configured to calculate attitude based on aircraft bank and tilt.

Each physical probe and each virtual probe is assigned to a zone of the fuel tank.

The physical probes are spaced throughout the fuel tank such that at least one of the plurality of physical probes is always intersected by a surface of the fuel.

The physical probes are capacitive probes.

The fuel quantity processing unit calculates the total volume of fuel using a model of the fuel tank comprising a plane representing the fuel, the plane calculated from heights of fuel at each physical probe.

The plane can be extrapolated to calculate height of fuel at each virtual probe location.

The total volume of fuel in the fuel tank is calculated by summing volumes corresponding to each virtual probe location and each physical probe location, the volumes calculated from the height of fuel at each virtual or physical probe location.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of fuel gauging for an aircraft, the method comprising:
   determining an attitude and an acceleration of a fuel tank;
   obtaining measured capacitances from physical probes within the fuel tank;
   determining a height of fuel in the fuel tank relative to each of the physical probes using the measured capacitances of the physical probes and the attitude of the fuel tank;
   estimating a height of fuel relative to each of a plurality of virtual probes based on the heights of fuel relative to the physical probes and the attitude of the fuel tank; and
   determining a total volume of fuel in the fuel tank using the heights of fuel relative to the physical probes, the heights of the fuel relative to the virtual probes, and the attitude of the fuel tank;
   wherein determining a height of fuel in the fuel tank relative to each of the physical probes comprises:
   calculating a fractional fuel coverage relative to each of the physical probes;
   calculating an effective top for each of the physical probes;
   calculating an effective bottom for each of the physical probes; and
   calculating a height of fuel in the fuel tank relative to each of the physical probes using the fractional fuel coverage, the effective top, and the effective bottom.

2. The method of claim 1, wherein the physical probes are spaced throughout the fuel tank such that at least one physical probe is always intersected by a surface of the fuel.

3. The method of claim 1, wherein determining the attitude and acceleration of the fuel tank comprises referencing a default attitude and acceleration for the aircraft.

4. The method of claim 1, further comprising determining the rotation and the pitch of the physical probes within the fuel tank from the attitude of the fuel tank.

5. The method of claim 1, wherein the physical probes are each assigned coordinates within the fuel tank, and wherein the assigned coordinates of each probe are used in combination with the measured capacitances of each probe and the attitude of the fuel tank to determine the height of fuel in the fuel tank relative to each of the physical probes, and to estimate the height of fuel relative to each of the plurality of virtual probes.

6. The method of claim 1, wherein calculating the fractional fuel coverage comprises using the measured capacitance, a dry capacitance, and an active capacitance to calculate the fractional fuel coverage.

7. The method of claim 1, wherein calculating heights of fuel relative to virtual probes comprises extrapolating the heights of fuel relative to the physical probes to the virtual probe locations.

8. The method of claim 1, wherein each physical probe is assigned to a zone of the fuel tank, and each virtual probe is assigned a zone of the fuel tank.

9. The method of claim 8, wherein determining a total volume of fuel in the fuel tank comprises:
   inserting the height of fuel relative to each physical probe in to a look-up table to obtain a zone fuel volume corresponding to each physical probe;
   inserting the height of fuel relative to each virtual probe in to a look-up table to obtain a zone fuel volume corresponding to each virtual probe; and
   adding together the zone fuel volumes corresponding to each physical probe and the zone fuel volumes corresponding to each virtual probe.

10. The method of claim 8, further comprising determining a fuel mass of the fuel tank by multiplying the total volume of fuel in the fuel tank by a density of fuel in the fuel tank.

11. A fuel gauging system for an aircraft comprising:
a fuel tank containing a plurality of physical probes;
a data concentrator configured to receive signals from the plurality of physical probes;
an avionics system configured to calculate attitude of the aircraft; and
a fuel quality processing unit designed to receive data from the data concentrator and the avionics system, the fuel quality processing unit configured to calculate a total volume of fuel in the fuel tank based on received signals from the plurality of physical probes indicative of the heights of fuel relative to the plurality physical probes, simulated signals from a plurality of virtual probes indicative of the heights of fuel relative to the plurality virtual probes, and the attitude of the aircraft
wherein the fuel quality processing unit is configured to determine a height of fuel in the fuel tank relative to each of the plurality of physical probes by:
calculating a fractional fuel coverage relative to each of the plurality of physical probes;
calculating an effective top for each of the plurality of physical probes;
calculating an effective bottom for each of the plurality of physical probes; and
calculating a height of fuel in the fuel tank relative to each of the plurality of physical probes using the fractional fuel coverage, the effective top, and the effective bottom.

12. The system of claim 11, further comprising an aeronautical radio configured to communicate between the fuel quality processing unit and the avionics system.

13. The system of claim 11, wherein the avionics system is configured to calculate attitude based on aircraft bank and tilt.

14. The system of claim 11, wherein each physical probe and each virtual probe is assigned to a zone of the fuel tank.

15. The system of claim 11, wherein the physical probes are spaced throughout the fuel tank such that at least one of the plurality of physical probes is always intersected by a surface of the fuel.

16. The system of claim 11, wherein the physical probes are capacitive probes.

17. The system of claim 11, wherein the fuel quantity processing unit calculates the total volume of fuel using a model of the fuel tank comprising a plane representing the fuel, the plane calculated from heights of fuel at each physical probe.

18. The system of claim 17, wherein the plane can be extrapolated to calculate a height of fuel at each virtual probe location.

19. The system of claim 18, wherein the total volume of fuel in the fuel tank is calculated by summing volumes corresponding to each virtual probe location and each physical probe location, the volumes calculated from the height of fuel at each virtual or physical probe location.

20. The system of claim 11, wherein calculating the fractional fuel coverage comprises using a measured capacitance, a dry capacitance, and an active capacitance to calculate the fractional fuel coverage.

* * * * *

UNITED STATES PATENT AND TRADEMARK OFFICE
CERTIFICATE OF CORRECTION

PATENT NO. : 10,564,022 B2
APPLICATION NO. : 15/490568
DATED : February 18, 2020
INVENTOR(S) : Barry R. Olson Page 1 of 1

It is certified that error appears in the above-identified patent and that said Letters Patent is hereby corrected as shown below:

In the Specification

Column 6, Line 11:
Delete "58"
Insert --avionics 58--

Signed and Sealed this
Twenty-fourth Day of March, 2020

Andrei Iancu
*Director of the United States Patent and Trademark Office*